(12) United States Patent
Sugimoto (10) Patent No.: US 6,750,890 B1
(45) Date of Patent: Jun. 15, 2004

(54) METHOD AND DEVICE FOR DISPLAYING A HISTORY OF IMAGE PROCESSING INFORMATION

(75) Inventor: Seigou Sugimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/571,537

(22) Filed: May 16, 2000

(30) Foreign Application Priority Data

May 17, 1999 (JP) .......................................... 11-136267
Apr. 10, 2000 (JP) ...................................... 2000-108424

(51) Int. Cl.$^7$ ................................................. G09G 5/00
(52) U.S. Cl. ........................ 345/838; 345/594; 345/764
(58) Field of Search ............................... 345/704, 764, 345/838, 594, 779, 781, 866

(56) References Cited

U.S. PATENT DOCUMENTS 5,844,542 A * 12/1998 Inoue et al. ................. 345/594
6,337,692 B1 * 1/2002 Rai et al. .................... 345/594
6,357,038 B1 * 3/2002 Scouten ....................... 717/122

OTHER PUBLICATIONS

"Using Adobe Photoshop 5". Dan Giordan and Steven Moniz.. QUE Publishing. Jul. 1998. pp.: 10–13, 35, 36, 70, 71, 200–202, 224–227, 276–278, 517–519, 536–538, 585–587, and 605–610.*

* cited by examiner

Primary Examiner—John Cabeca
Assistant Examiner—Brian Detwiler
(74) Attorney, Agent, or Firm—Sughrue Mion, PLLC

(57) ABSTRACT

A method and device for displaying history information are provided in which, when a plurality of image processings are carried out repeatedly, a plurality of images which have been subjected to image processing automatically remain as a history record, and this history record is displayed in image states which can be visually discerned, such that a desired image can be intuitively determined. When an image which has been subjected to image processing on an image-to-be-processed display screen is closed and subjected to another image processing, or is subjected to an additional image processing, images displayed on the image-to-be-processed display screen up to before a next image processing is carried out are displayed as icons in a past image icon display portion beneath the image-to-be-processed display screen. Thus, a function can be provided for listing up a history of image processings or providing a gallery stocked with image states which are results of intermediate processings.

29 Claims, 10 Drawing Sheets

METHOD AND DEVICE FOR DISPLAYING A HISTORY OF IMAGE PROCESSING INFORMATION

BACKGROUND OF THE INVENTION

1. Field of the Invention

The present invention relates to a method and device for displaying history information used in an image processing device in which an image is fetched, and with the image displayed in a predetermined main region of a display screen, various image processings are carried out, and the results of the image processings are reflected in the displayed image.

2. Description of the Related Art

Conventionally, as a step after image processing in an image processing device, usually, the image processing which was carried out in the immediately previous operation could be undone, but the operator could not return to images before then.

In one function of an operating system, the entire history of commands during image processing is held, and the operator can return to a desired past image by undoing the commands one-by-one in an order opposite to the order in which the commands are held.

Expensive image processing software are equipped with a window which displays a record of past commands, as well as displays, in strings of characters which are recognizable to the operator, a record of the contents of past image processings.

However, it is difficult for an ordinary user to use this conventional history record in image processing devices because special knowledge is required in order to understand the history, and because the image state must be judged only from character or symbol information. Thus, much time is required for the user to locate the record corresponding to a desired image, and in some cases, it may not be possible for the user to locate the record. Moreover, in methods using this history, the desired history record is selected by using a mouse or the like, and the image corresponding to the record is called up from the storage device and displayed on the screen, and the image state is then finally clear to the user. Accordingly, if the record selected by the user does not correspond to the image the user desires, the user must repeat the operations of selecting the image, calling up the image, and displaying the image, which is inefficient.

Further, in order to retain all of the images on which various image processings have been carried out, a saving process is required each time an image processing is completed.

SUMMARY OF THE INVENTION

In view of the aforementioned, an object of the present invention is to provide a method and device for displaying history information in which, when image processings are carried out repeatedly, a plurality of images which have been subjected to image processing automatically remain as a history record, and this history is displayed in image states which can be visually discerned, such that a desired image can be intuitively determined.

A first aspect of the present invention is a method of displaying history information including the steps of: displaying an image in a predetermined main region, and displaying history information in a predetermined auxiliary region; carrying out a plurality of image processing on the image displayed in the main region; and displaying in the main region an image after image processing is carried out, and displaying at least one of an image before image processing is carried out and information relating to the image before image processing is carried out, in the auxiliary region as history information in the order in which the image processings are carried out.

In accordance with the first aspect, in addition to a main region in which the image, which is the object of image processing, is displayed on the screen, an auxiliary region is provided. Images which have been subjected to image processing until now are displayed in chronological order as history information. For example, by displaying the images in order from the oldest from the left side of the screen, the user can easily visually grasp the image processed states that have been generated until now.

In a second aspect of the present invention, in consistent with the first aspect, the image displayed in the auxiliary region is one of the image before image processing is carried out and displayed in the main region and an image in which a portion of the image before image processing is carried out is reduced.

In accordance with the second aspect, because the displayed history information is a reduced image, the image can be discerned visually.

In a third aspect of the present invention, in consistent with the first aspect, information relating to an image displayed in the auxiliary region is one of characters corresponding to the image processing, words corresponding to the image processing, and an image obtained by subjecting the image to a predetermined processing.

In accordance with the third aspect, the history information is an image in which the image processing command or the results of image processing are displayed by characters, words or graphically. For example, if there are images which have been subjected to image processing but wherein the difference therebetween is hard to discern, it will be extremely difficult to discern the difference when the reduced images of these images are viewed. Further, there are cases in which processings are carried out which are not expressed in the image, such as a change in the setting of the default value or the like. In such cases, there is absolutely no change in the image before processing and the image after processing, and even if reduced images thereof are displayed side-by-side, they will not be able to be distinguished from one another. Here, the differences can be clearly expressed if the changed portions or the contents of the change are expressed by characters, or if a graphical image is displayed in which, for example, the changed portion is displayed in an emphasized state.

In a fourth aspect of the present invention, in consistent with the first aspect, when the history information is selected, a predetermined processing is carried out on the history information.

In accordance with the fourth aspect, the history information is displayed as an icon, as a button or as an object such as a picture on which the image information is pasted. A predetermined processing can be carried out by selecting a region of the history information by using a selecting means such as a mouse, a joystick or the like.

In the fifth aspect of the present invention, in consistent with the fourth aspect, the predetermined processing is processing for displaying in the main region the image corresponding to the selected history information.

In accordance with the fifth aspect, by selecting a region of the history information by using a selecting means such as a mouse, the image corresponding to the selected history information is displayed in the main region, and the image corresponding to the selected history information is made to be the object of image processing.

In a sixth aspect of the present invention, in consistent with the third aspect, when an image in the auxiliary region is selected, information relating to the image is displayed instead of the image, and when information relating to the image is selected, the image is displayed.

In accordance with the sixth aspect, by selecting a region of the history information by using a selecting means such as a mouse or the like, display of the history information can be switched between a reduced image of the image before image processing is carried out, and information relating to the image which information is one of characters expressing the contents of the image processing, words expressing the contents of the image processing, or an image prepared by displaying the contents of image processing in an emphasized state. In this way, it is easy for the user to select the image.

In the seventh aspect of the present invention, in consistent with the first aspect, the main region and the auxiliary region are displayed in independent window states, and the main region and the auxiliary region are moved independently within a single screen.

In accordance with the seventh aspect, if the main region and the auxiliary region are formed as respectively different windows, the relative positional relationship therebetween can be freely changed. For example, the main region and the auxiliary region may be displayed on the screen in the state in which they are contacting one another, or the display frames thereof may be moved to separate the two, or one region may be placed to partially overlap the other.

In the eighth aspect of the present invention, in consistent with the first aspect, when an image processing is carried out on the image displayed in the main region, the image processing is carried out after automatically returning to an image state before the image processing immediately before this image processing.

In accordance with the eighth aspect, when respective image processings are carried out with plural image processings overlapping (i.e., image processing carried out one after another on an image without returning to the original image), there are cases in which the user may wish to return to the original image and carry out a different image processing. Basically, in image processings such as color correction and the like, it is desirable to not carry out overlapping processing, and rather, to carry out processing a single time. Here, before the image processing is carried out, if a mode is set for automatically canceling image processings before the present image processing, there is no need to carry out a canceling operation each time, and workability improves. It is preferable that this mode can be set to on or off.

In a ninth aspect of the present invention, in consistent with the first aspect, when a maximum number of displayable history information in the auxiliary region has been exceeded and history information is to be additionally displayed in the auxiliary region, a history information, which has been displayed for the longest period of time and which is other than history information for which saving has been designated, is closed.

In accordance with the ninth aspect, if the storage capacity and the display region are sufficiently large, there is no need to limit the number of history information which are displayed. However, there are limits on the number of history information which can be displayed in the auxiliary region. Here, when the maximum number of displayable history information is exceeded, the history information are deleted from the oldest image, except for those information for which saving has been designated, and new history information are added. Although here, the maximum number of displayable history information is equal to the number of history information which can be displayed in the auxiliary region, by employing a scrolling method, the maximum number of displayable history information may be made greater than the number of history information which can be displayed in the auxiliary region.

In the tenth aspect of the present invention, in consistent with the ninth aspect, among the history information, the history information corresponding to the image which was an initial object of processing is history information for which saving has been designated.

In accordance with the tenth aspect, the image which is the initial object of processing, i.e., the original image, is selected as an image for which saving is designated. In this way, if the user wishes to redo image processing from the beginning, there is no need for the user to fetch the image from the file again, or to start up the software accompanying the TWAIN device and fetch the image, or the like. Workability is thereby improved.

The devices for displaying history information according to the eleventh through nineteenth aspects have the same effects as those described above, and therefore, detailed description thereof is omitted.

DESCRIPTION OF THE PREFERRED EMBODIMENTS

Basic Structure

Figure 1:
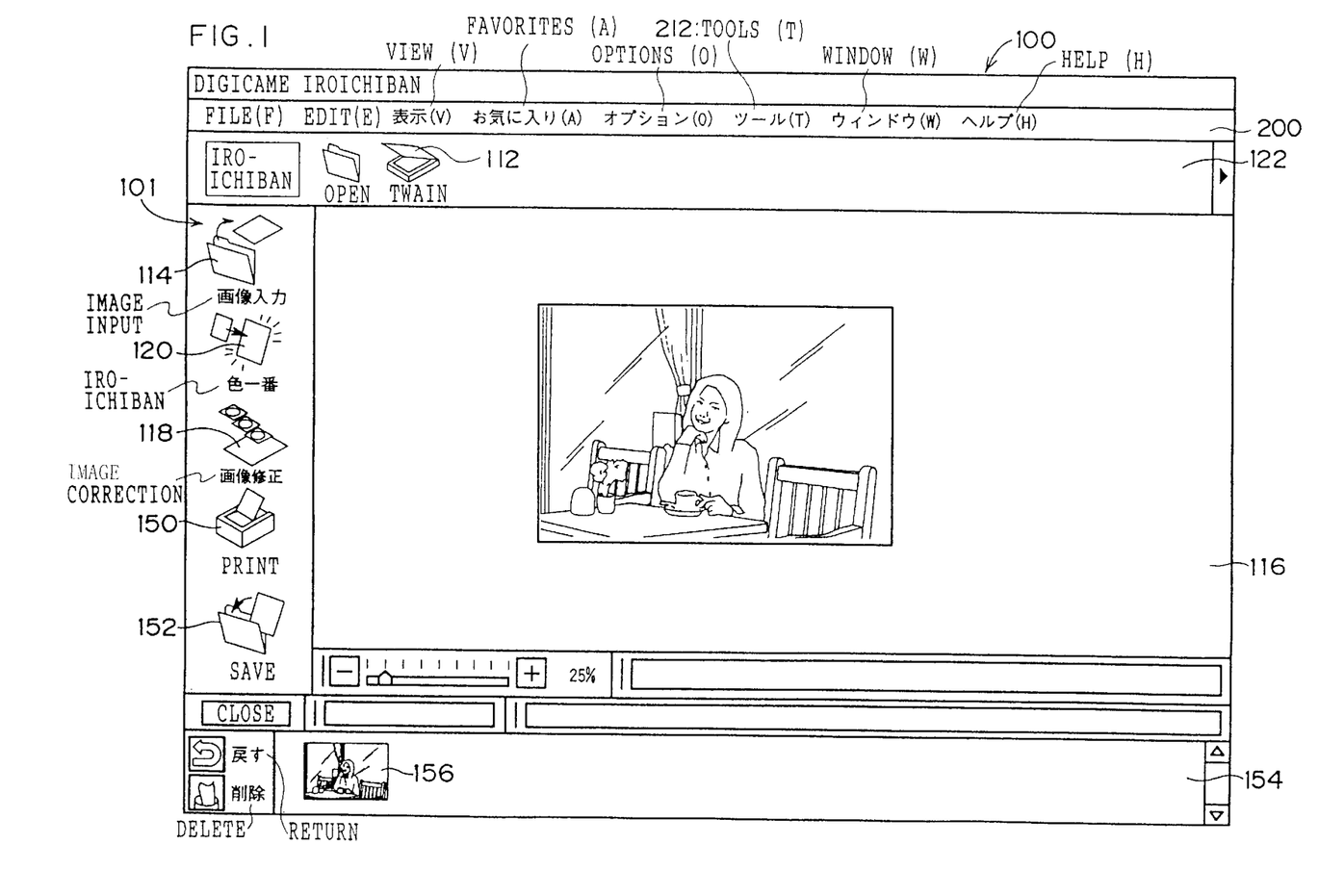
FIG. 1 is a screen display of an initial screen of an image processing software relating to an embodiment of the present invention.

FIG. 1 illustrates an initial screen 100 of an image processing software for a digital camera. (The trade name of this software is DIGICAME IROICHIBAN, and the software is manufactured by Fuji Photo Film Co., Ltd. Hereinafter, this software will simply be referred to as the "image processing software".) A vertical strip-like function selection bar 101 is provided at the left end of the initial screen 100. The following icons are disposed in a vertical column at the function selection bar 101: an icon 114 representing "image input", an icon 120 representing "IROICHIBAN", an icon 118 representing "image correction", an icon 150 representing "print", and an icon 152 representing "save". Further, a horizontal strip-like menu bar 122 is provided at the top end of the initial screen 100. Icon 111 representing "open" and icon 112 representing "TWAIN" are disposed in a horizontal row in the menu bar 122.

Figure 2:
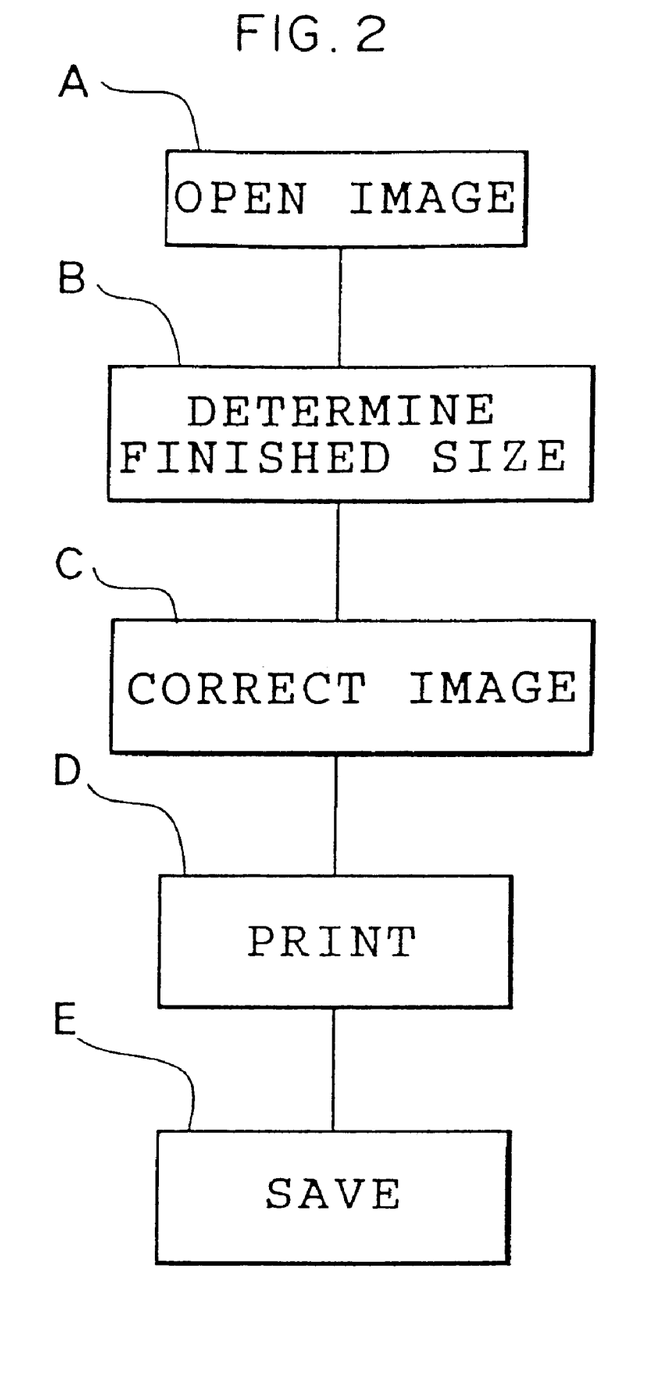
FIG. 2 is a basic operation flowchart of the image processing software relating to the embodiment.

In the image processing software, as illustrated in FIG. 2, image processing is carried out on the basis of the following basic flow of operations: an image is opened (step A), the finished size is selected (step B), the image is corrected (step C), the image is printed (step D), and the image is saved (step E).

Step A is the operation step for opening the image. Formats of images which can be handled are formats which can be fetched by clicking the icon 111 representing "open", such as bmp (bitmap), JPEG, TIFF, Photo CD, FUJIFILM Flash Pix CD (manufactured by Fuji Photo Film Co., Ltd.), as well as input from a TWAIn device.

By clicking on the icon 112 representing "TWAIN" in the initial screen 100 of FIG. 1, the software for image fetching which corresponds to a TWAIN device automatically starts up. Here, if an image is fetched from a recording medium (e.g., a CD, FD, MO), a TWAIN device, or a file of a hard disk, the icon 114 representing "image input" in the initial screen 100 is displayed in a bright color.

The image fetched from a recording medium (such as a CD, FD, MO or the like), a file of a hard disk, or a TWAIN device is displayed in an image-to-be-processed display screen 116 which is positioned in the center of the initial screen 100. In this state, operation at step (the finished sized determining step) is possible. The icon 118 representing "image correction" in the initial screen 100 can be clicked on in order to carry out the operation at step B. Note that this icon 118 is also used for correction of the image in subsequent step C, and by clicking on the icon 118, a menu listing respective image correction processings is displayed.

Step B is a step of carrying out operations for determining, before correction of the image is carried out, the finished size. By indicating one of the items on an operation bar (not illustrated) which is displayed on the screen at the time of operation, the image can be rotated, flipped horizontally, or flipped vertically. Further, if needed, two points can be designated, and horizontal or vertical fine adjustment can be carried out. Or, another operation bar (not shown) can be displayed on the screen, so that size adjustment, trimming adjustment, and F-DI adjustment can be carried out.

After the processing of step B (i.e., the layout of the image and the like) has been completed, the operation of subsequent step C (the image correction step) is carried out. If this step B for determining the finished size is not needed, it can be skipped, and the processing of the image correction step can be carried out.

In image correction step C, there are two main types of processing operations. The first is processing concentrated on the enhancement of the color tones (lightness, saturation, and hue) of the original image (the image-to-be-processed). (Hereinafter, this processing will be referred to as "IROICHIBAN processing".) The second is processing which carries out manipulation on the basis of the original image (the image-to-be-processed). (Hereinafter, this processing will be referred to as "image manipulation processing".) Although there are processings which are used in both of the IROICHIBAN processing and image manipulation processing, basically, IROICHIBAN processing is an automatic operation, whereas image manipulation processing is a manual operation. Namely, the basic difference between the two is that, in IROICHIBAN processing, processing is carried out automatically by a preset computation processing which has been developed on the basis of accumulated knowledge and experimentation in the field of photographic technology, whereas the image manipulation processing allows the operator to process the image in accordance with his/her preferences.

Figure 3:
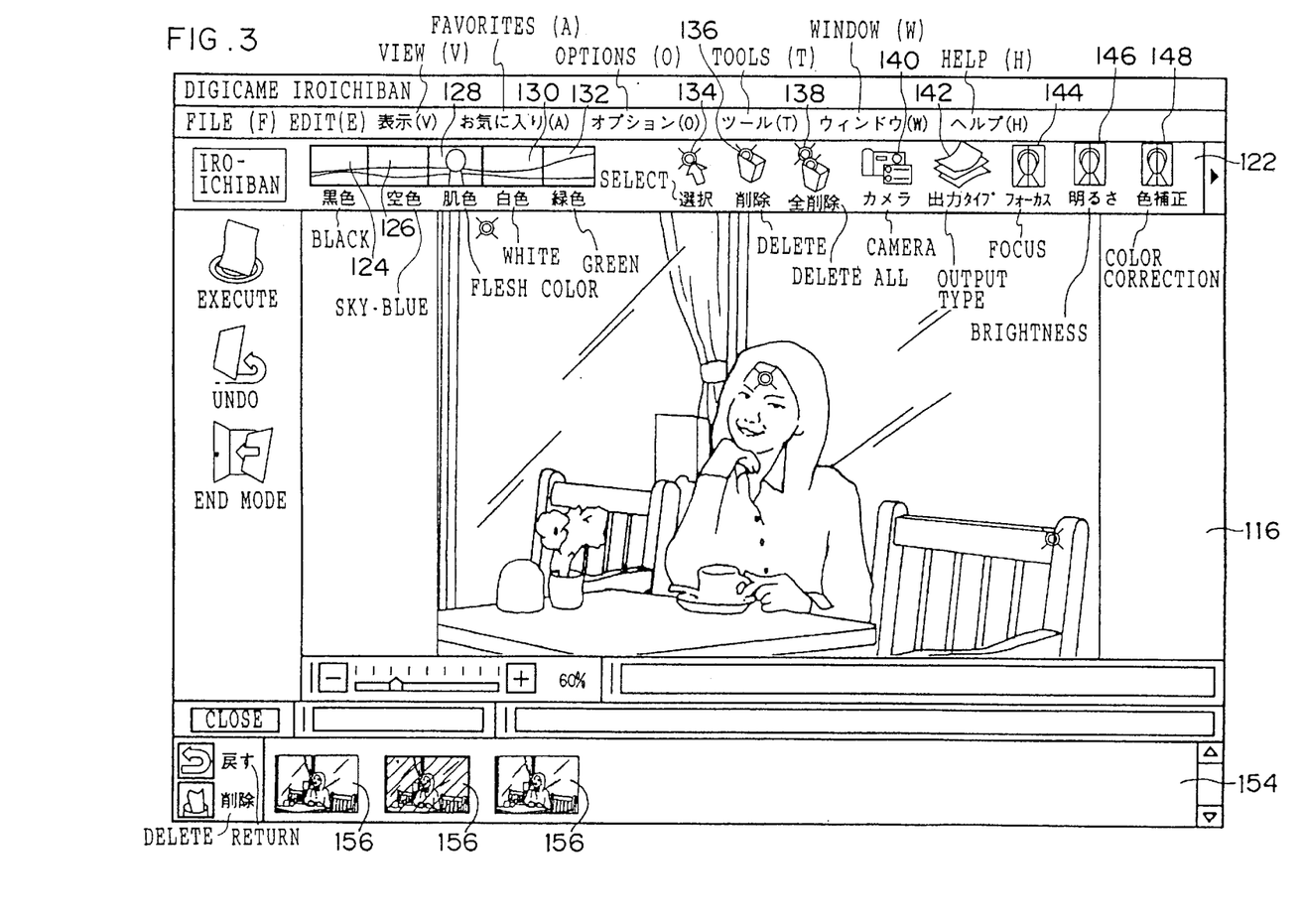
FIG. 3 is a screen display of an operation screen of the image processing software relating to the embodiment.

To implement the IROICHIBAN processing, by clicking on the icon 120 representing "IROICHIBAN" in the initial screen 100, the detailed function items are displayed on the menu bar 122 as illustrated in FIG. 3.

The following icons are displayed in the menu bar 122 at this time: a black color icon 124, a sky-blue color icon 126, a flesh color icon 128, a white color icon 130, a green color icon 132, a select icon 134, a delete icon 136, a delete all icon 138, a camera icon 140, an output type icon 142, a focus icon 144, a brightness icon 146, and a color correction icon 148.

One image is displayed, like a panorama image, within the black color icon 124, the sky-blue color icon 126, the flesh color icon 128, the white color icon 130, and the green color icon 132. Namely, a panorama image extending from the icon 124 through the icon 132 such as the following may be used. Dark clouds hang over the left end of the horizon, and gradually become white clouds toward the right. A blue sky stretches out at the left side of a green tree covered mountain at the right side. A model stands in the center of the scene. The colors represented by the five icons are all included in this panorama image, and each color is positioned within the region of the corresponding icon. As compared with a case in which colors expressed in characters are merely used on the icons, the appearance is more attractive, and the five color icons are easy to use as they can be easily identified as color images.

The operations carried out by clicking the respective icons are as in following Table 1.

TABLE 1

| Icon | Operation |
| --- | --- |
| black color | enhance the black color in the selected portion |
| sky-blue color | enhance the sky-blue color in the selected portion |
| flesh color | enhance the flesh color in the selected portion |
| white color | enhance the white color in the selected portion |
| green color | enhance the green color in the selected portion |
| select | select the portion to be enhanced |
| delete | delete the selected point |
| delete all | delete all selected points |
| camera | designate camera type |
| output paper type | designate type of paper for output |
| focus | determine sharpness enhancement |
| brightness | correct brightness |
| color correction | overall color correction |

In the image manipulation processing, by clicking the icon 118 representing "image correction", the items resolution, focus, brightness, vividness, color special, RGB, and cut-out are displayed in a pull-down menu. By selecting one or these items, the corresponding item is displayed at a position of the menu bar 122 of the initial screen 100. This image manipulation processing is processing similar to that of commercially-available image processing software (e.g., Adobe's PHOTOSHOP), and description thereof will therefore be omitted.

When the image correction processing of step C is completed, printing processing is implemented at step D for carrying out printing. In order to implement the printing processing step, first, by clicking on the icon 150 representing "print" in the initial screen 100, a print operation bar (not illustrated) is displayed in the menu bar 122. There are four items in the print operation bar: setup, preview, print, and F-DI order. Because this printing processing step d is substantially the same as printing processing in widely known operating systems, description thereof will be omitted.

The final saving processing step E is a step for saving the finished image in a file or the like. By clicking on the icon 152 representing "save" of the initial screen 100, a save operation bar(not shown) is displayed on the menu bar 122. This save operation bar includes two items: overwrite and save as. In the same way as the printing processing step D, because these processings are well known, description thereof is omitted.

The above is a basic outline of the image processing software applied to the present embodiment. The main feature is, in addition to the general image processings described above as the image manipulation processings, the image processing software also includes an automatic color tone correcting mode which is called IROICHIBAN processing and which freely uses photographic technology. In this way, images photographed by using a digital camera or the like can be corrected to a level on par with professionals, which greatly contributes to an improvement in image quality.

The image processing software relating to the present embodiment is provided with IMAGE EXPLORER as an option tool.

Figure 4:
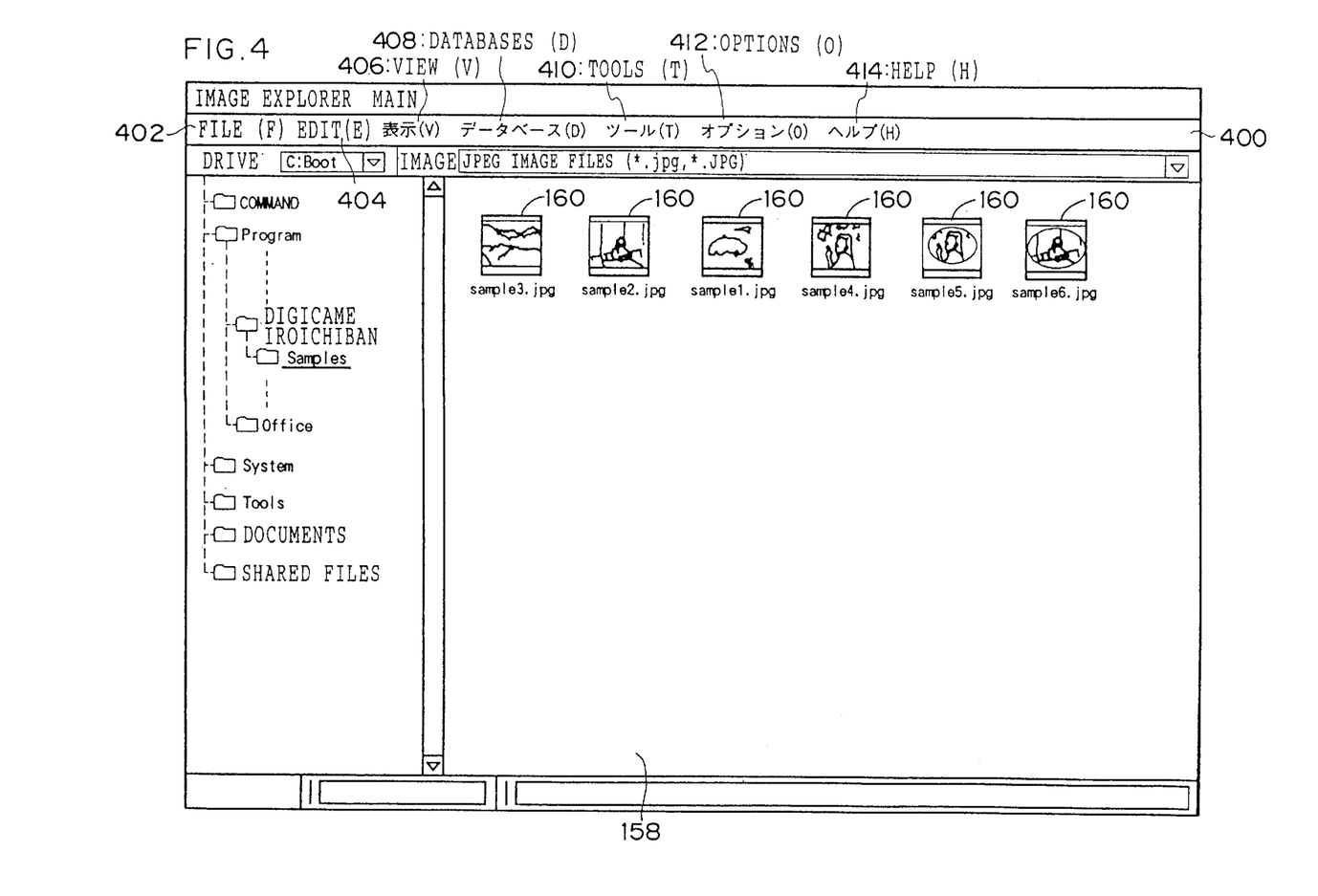
FIG. 4 is a screen display of a window screen illustrating IMAGE EXPLORER which is one option tool of the image processing software relating to the embodiment.

To activate IMAGE EXPLORER, by selecting "tools" 212 from a menu bar 200 of the initial screen 100 and selecting "IMAGE EXPLORER" from the pulled-down menu, a screen 158 shown in FIG. 4 is started up.

The IMAGE EXPLORER screen 158 displays reduced versions of images, which have actually been subjected to image processing, together with the file names of these images. When an operator is to select an image, the desired image can be selected by the operator viewing the image of an image icon 160 and operating a selecting device.

A menu bar 400 of the IMAGE EXPLORER screen 158 is a menu including the following seven items: file 402, edit 404, view 406, databases 408, tools 410, options 412, and help 414.

PIXEL EDITOR is included as a second option tool in the image processing software relating to the present embodiment.

Figure 5:
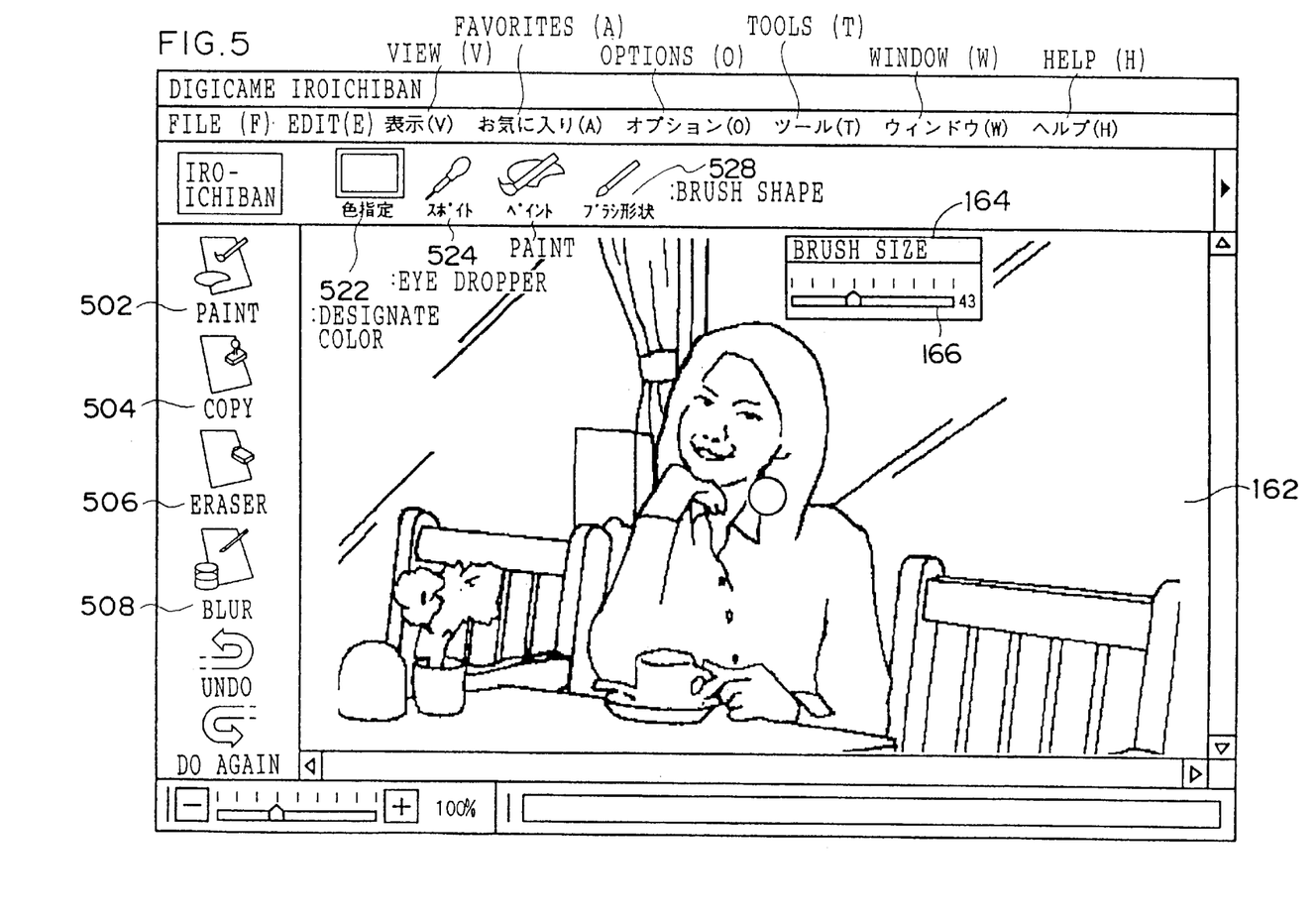
FIG. 5 is a screen display of an operation screen of PIXEL EDITOR which is one option tool of the image processing software relating to the embodiment.

To activate PIXEL EDITOR, by selecting "tools" 212 from the menu bar 200 of the initial screen 100 and "PIXEL EDITOR" from the pulled-down menu, a screen 162 in FIG. 5 is started up.

The PIXEL EDITOR screen 162 is equipped with the four functions of paint 502, copy 504, eraser 506, and blur 508, and each is represented by an icon. When a function is to be used (except for eraser 506), designation of the color can be effected in one of the following two ways: a color designation menu 522 is selected and a color is designated from among the palette of colors displayed in a matrix-like arrangement, or an eye-dropper menu 524 is selected and a color is designated by indicating an arbitrary position of the image displayed on the PIXEL EDITOR screen 162. Further, by clicking on a brush shape menu 528, a brush shape can be selected from among square, round, and air brush. By the operator selecting the desired color, selecting the desired brush shape, and designating with the mouse pointer a position to be processed, manipulation of the image-to-be-processed is made possible. (In this case, if continuous positions are to be processed, the operator drags the mouse from an initial pointer position.) The eraser 508 erases only the manipulated areas, and does not in any way affect the original image-to-be-processed screen.

In addition to the four function icons 520 through 508, icons for designating undo and redo are also provided, so that the manipulation of the image-to-be-processed can be undone or done again.

Further, a window 164 for designating the brush size is always open such that it is superposed on the image-to-be-processed display screen 162. (The window 164 has an extremely small area as compared with the screen 162.) As slider bar 166 is provided in the window 164. By sliding the slider bar 166 toward the right, the brush size is increased. By sliding the slider bar 166 toward the left, the brush size is decreased. The brush sizes are also displayed as numerical values at the right side of the slider bar 166.

Detailed Description of the Features of the Present Invention

Figure 6:
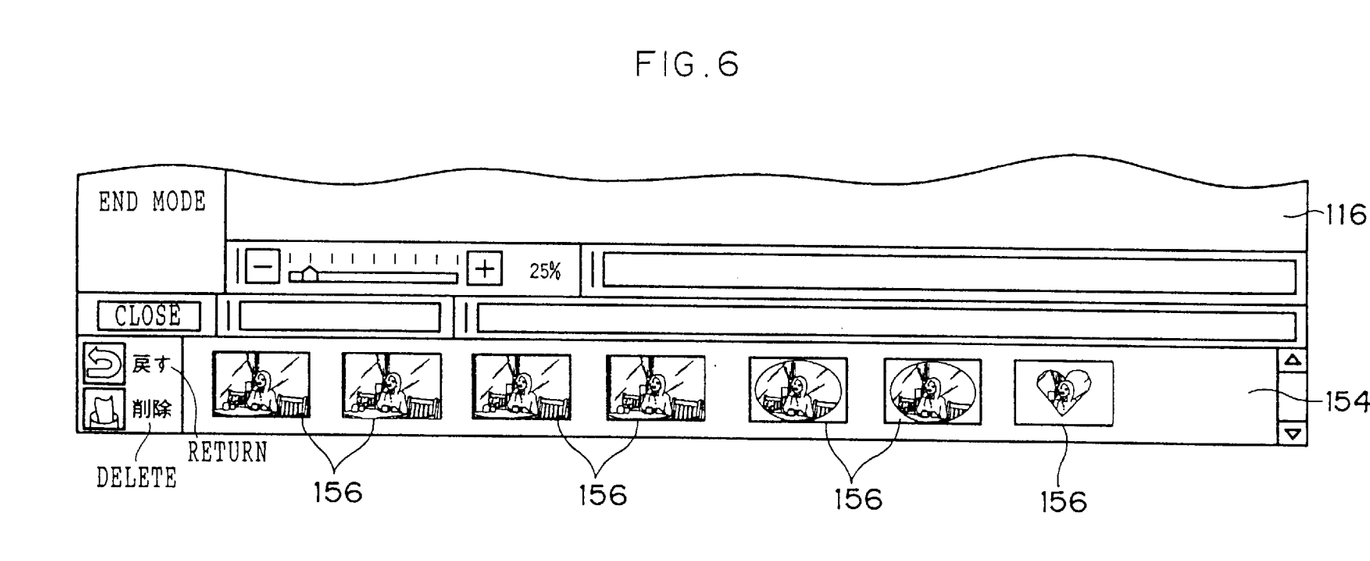
FIG. 6 is an enlarged view of a past image icon display portion, which illustrates one example of the method of displaying past images of the present invention.

As illustrated in FIG. 6, a horizontally-extending, strip-like past images icon display portion 154 is provided under the image-to-be-processed display portion 116 of the initial screen 100. In the past image icon display portion 154, the past images which have been processed until now are displayed as icons (image icons) within frames of predetermined lengthwise and widthwise direction dimensions (in this case, rectangular) in order starting from the left with the oldest image. Namely, the image displayed at the left end of the past image icon display portion 154 is the original image. Each time IROICHIBAN processing or image manipulation processing is executed, the image that had been displayed on the image-to-be-processed display portion 116 until then is closed, and the closed image (a past image) is displayed in the horizontal row starting from the original image so as to be displayed as a past record. By clicking on one of image icons 156 displayed in the past image icon display portion 154, the image icon 156 is made into a highlighted image, and the fact that it has been selected can be expressed visually. Further, by double clicking, the old image (closed image) corresponding to that image icon 156 can be displayed on the image-to-be-processed display portion 116. Further, the image icon display portion 154 of the present embodiment can display up to 10 image icons 156, and the image icons 156 displayed therein, other than the original image icon 156 (on the left end) are updated in a FIFO (first-in, first-out) order. Moreover, past image icons 156 which are no longer needed can be arbitrarily deleted by the operator selecting them.

Operation of the present embodiment will now be described.

In the image input mode, an image, which is fetched from a removable recording medium other than a hard disk (such as a CD, FD, MO) or from a file stored in a hard disk or from a TWAIN device, is displayed on the image-to-be-processed display screen 116 positioned at the center of the initial screen 100.

By clicking on the icon 120 representing "IRO-ICHIBANt" or the icon 118 representing "image correction", image processing corresponding to that function can be carried out on the image displayed on the image-to-be-processed display screen 116.

Here, when a predetermined image processing is carried out on the original image, the image-processed image is displayed on the image-to-be-processed display screen 116. When image processing is repeated plural times, the image displayed on the image-to-be-processed display screen 116 is switched successively. In this case, conventionally, by opening another window and selecting the item expressing in characters the record of image processing, an arbitrary image from the original image to the most recently image-processed image would be displayed again on the image-to-be-processed display screen 116. When the operator wished to return to the immediately previous image, by selecting the close function, this immediately previous image could then be displayed on the image-to-be-processed display screen 116 relatively simply.

However, there are cases in which a desired image cannot be selected intuitively (visually) by selection of an image from a string of characters. Further, selecting an image by repeatedly using the close function results in poor work efficiency.

Thus, in the present embodiment, the horizontally-extending, strip-like past image icon display portion 154 is provided under the image-to-be-processed display screen 116.

As described above, the image icon 156 is prepared for each of the images that has been obtained until now by carrying out image processing repeatedly, and these image icons 156 are displayed in a horizontal row in the past image icon display portion 154. In the present embodiment, the original image is displayed as an icon at the left end of the past image icon display portion 154, and the other image icons 156 are aligned in order from the oldest to the most recent, starting with the original image. Namely, the longitudinal direction of the past image icon display portion 154 is an axis representing time, with the original image being the origin. New past images (image icons 156) are added successively in a scroll-like manner, and the past images are deleted in order. (Up to 10 image icons 156 can be displayed at one time.) Because the original image always remains on the image icon display portion 154, the operator can return to the original state at any time.

The image icon 156 can be selected by the operator. By the operator clicking on the image icon 156, that image icon 156 is highlighted, such that the fact that the image icon 156 has been selected is visually expressed. Further, by the operator double clicking on the image icon 156, the image displayed on the image-to-be-processed display screen 116 is switched to the image represented by the clicked-on image icon 156. If the image which has been displayed to date on the image-to-be-processed display screen 116 is subjected to any type of image processing, the image-processed image is displayed as an icon on the past image icon display portion 154 as a new record, whereas if no image processing is carried out, the image is returned to the original image icon 156 state.

Namely, the operator visually confirms the state of the image, and while intuitively (visually) judging what type of image processings have been carried out on the image, can select an image. In this way, if two images which are not in consecutive order are displayed alternately or simultaneously on the image-to-be-processed display screen 116 such that even minor differences between the two images can be visually determined, the selection of the two images and the display operation are carried out in a short period of time, and thus, it is easy to discern the differences therebetween.

In this way, a desired image processed state, from among the past images up to now, can be reproduced by a simple operation (one operation). Further, a total of 10 past images can be displayed in the past image icon display portion.

In the present embodiment, 10 images can be displayed on the past image icon display portion. However, 10 is the number of icons that can be displayed at a single time within the region of the past image icon display portion in the present embodiment, and the present invention is not limited to the same. If there are more than 10 image icons, even if all of the image icons are not displayed on the past image icon display portion at the same time, they may be displayed by scrolling horizontally.

In the present embodiment, only the original image always remains in the image icon display portion. However, among the past images, plural image icons may be selected as images which are not to be deleted.

Characters or symbols expressing the results of image processing or the like may be added in correspondence with the respective image icons 156. Examples of the results of image processing are the contents of processing (brightness/saturation/hue and the like) and the processing factors thereof, as well as manipulated items such as sepia filter and the like.

Further, one or plural past images (image icons 156) displayed on the past image icon display portion may be selected and printed out.

In accordance with the present embodiment, when an image-processed image on the image-to-be-processed display screen 116 is to be closed and another image processing is to be carried out, or is to be subjected to an additional image processing, the image which has been displayed on the image-to-be-processed display screen 116 before this latest image processing is carried out is displayed as an icon in the past image icon display portion as a record, beneath the image-to-be-processed display screen 116. Thus, a function of listing up the record of past images or a function for creating a gallery containing images which are the results of intermediate processing can be provided.

Further, because the images are displayed as icons, an image can be selected easily by clicking thereon. Displaying an image again on the image-to-be-processed display screen 116 and printing can be carried out easily.

(Modified Example of Image Icon 156)

In this modified example, what type of processing was carried out on the previous image can be displayed as the image icon 156 by using characters, words, or graphics. This modified example includes the following two types of techniques: a first technique in which the image icon 156 is a reduced image as in the previously-described embodiment, and a second technique in which, rather than a reduced image, the image itself of the image icon expresses the processing.

Figure 7A:
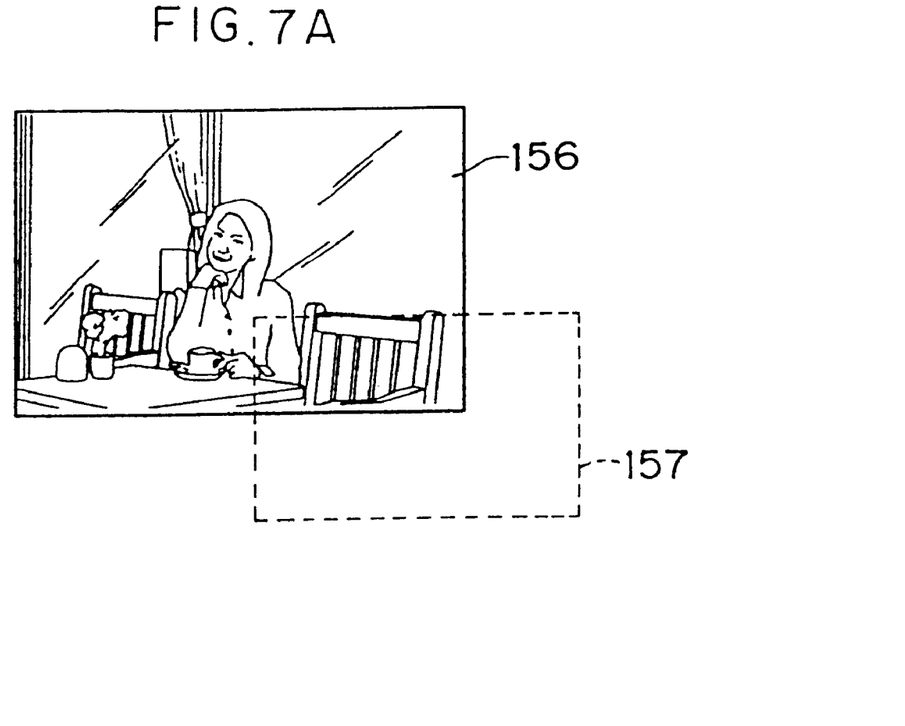
FIG. 7A is a diagram illustrating a regular state of a past image display icon relating to a first modified example of the present invention.

In the first technique, a hidden window 157 (see FIG. 7B) is provided for the image icon 156. The hidden window 157 is usually not displayed (see FIG. 7A). Here, the image icon 156 is clicked on and becomes a highlighted image. Thereafter, the image icon 156 is clicked on again (at a time which is sufficiently after the first click to prevent this second click from being interpreted as being part of a double click), such that a portion of the hidden window 157 is overlapped on the image icon 156. In this case, the hidden window 157 is the top (overlaying) window. This hidden window 157 expresses the changed state with respect to the previous image. Thus, even cases can be handled in which processing is carried out which does not change the image at all, e.g., the default value is changed or the like.

Figure 7B:
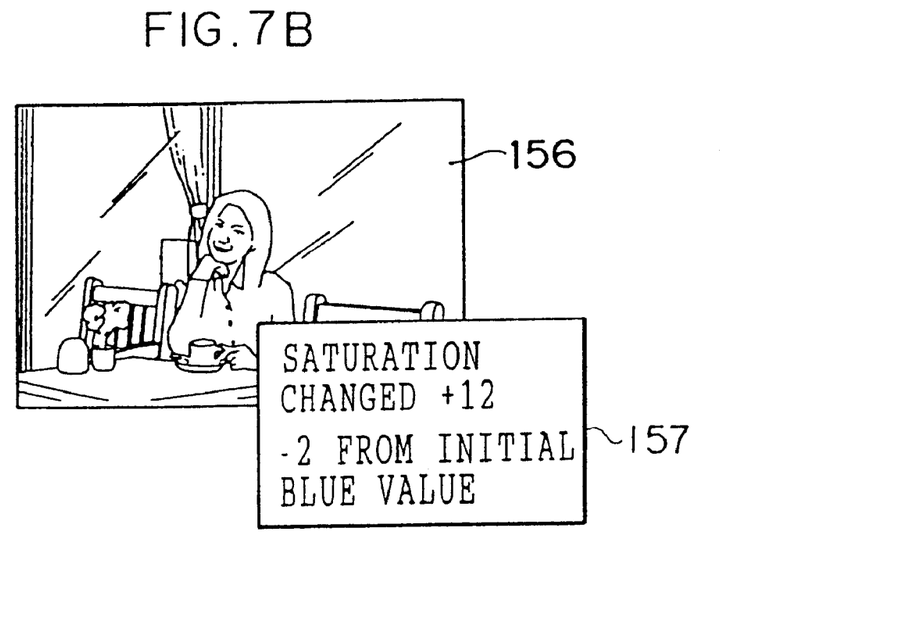
FIG. 7B is a diagram illustrating a hidden window display state of a past image display icon relating to a first modified example of the present invention.

The hidden window 157 can be closed by clicking one more time.

Figure 8A:
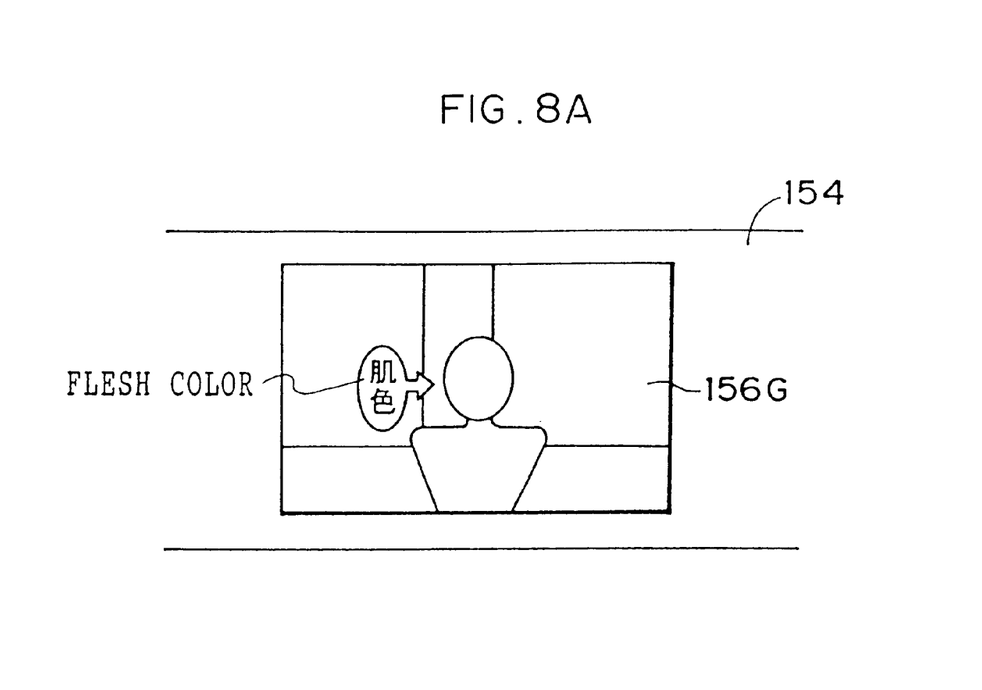
FIG. 8A is a diagram illustrating a past image display icon relating to a second modified example of the present invention.
Figure 8B:
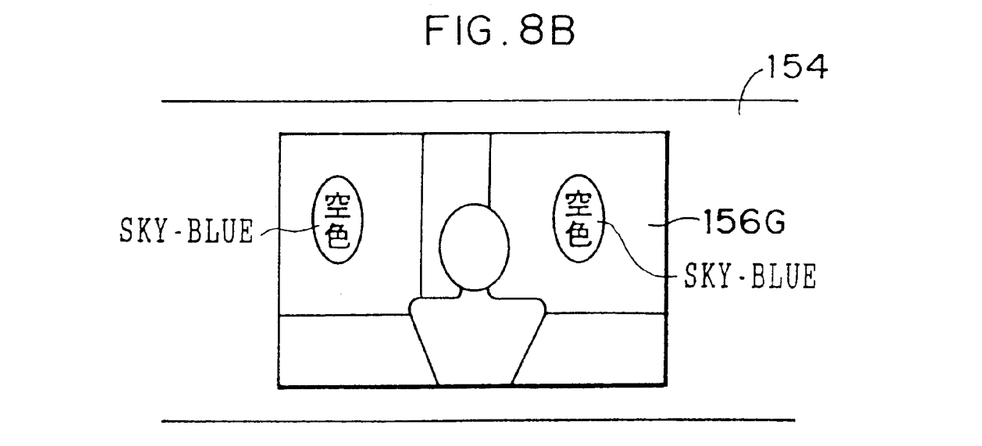
FIG. 8B is a diagram illustrating a past image display icon relating to a second modified example of the present invention.

In the second technique, the past image is not a reduced image, and rather, as illustrated in FIGS. 8A and 8B, is a graphic image 156G. Even in cases in which the image has hardly changed as compared to the previous image, the changed portions are displayed in a state in which they are emphasized, and a comment in characters or words or an icon image or the like is superposed on the image in order to emphasize the changed portions. In this way, the changes are expressed visually. In this way, the image icon is not exactly a realistic expression of the image state as in the case of using the reduced image as the image icon. However, here, the changes from the previous image state can be clearly discerned.

The past image may be displayed by using a combination of the reduced image of the embodiment described previously, the first technique of the modified example, or the second technique of the modified example. For example, when there are changes in the image, the past image may be a reduced image, and when a processing is also carried out which does not change the image (such as changing the default value), the hidden window may be added. Or, when the image itself is not changed, the graphic image may be used, and if needed, the hidden window 157 may be added thereto.

(Modified Example of Image-to-be-processed Display Portion 116 and Past Image Icon Display Portion 154)

Figure 9:
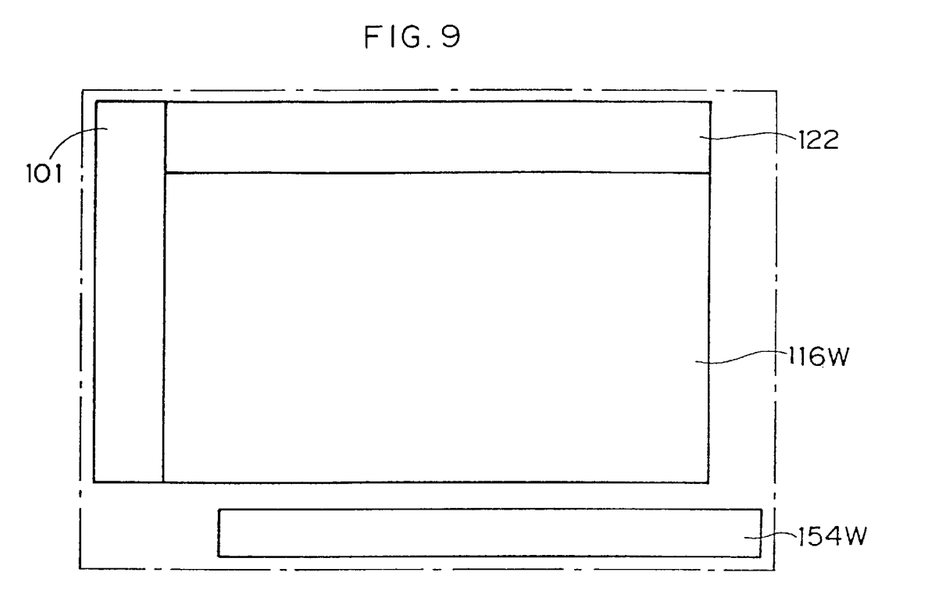
FIG. 9 is a diagram illustrating a relative positional relationship between an image-to-be-processed display screen (main region) and a past image icon display portion (auxiliary region), relating to a modified example of the present invention.

In the above-described embodiment, the image-to-be processed display portion 116 which is the main region and the past image icon display portion 154 which is the auxiliary region are displayed one above the other with the bottom edge of the portion on top and the top edge of the portion on bottom coinciding. However, as illustrated in FIG. 9, the image-to-be processed display portion 116 and the past image icon display portion 154 may be window-like screens 116W and 154W.

Figure 10:
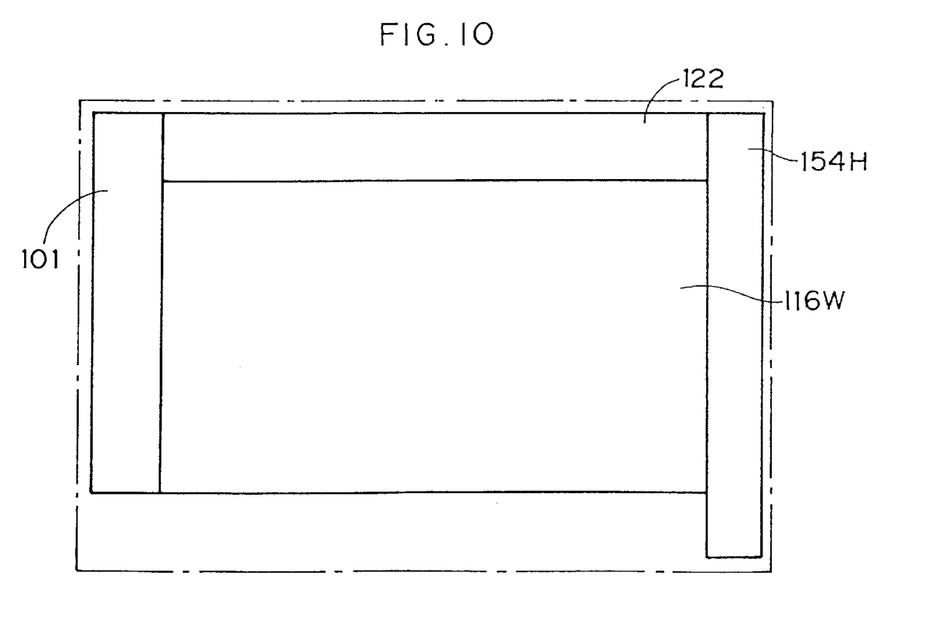
FIG. 10 is a diagram illustrating a relative positional relationship between an image-to-be-processed display screen (main region) and a past image icon display portion (auxiliary region), relating to a modified example of the present invention.
Figure 11:
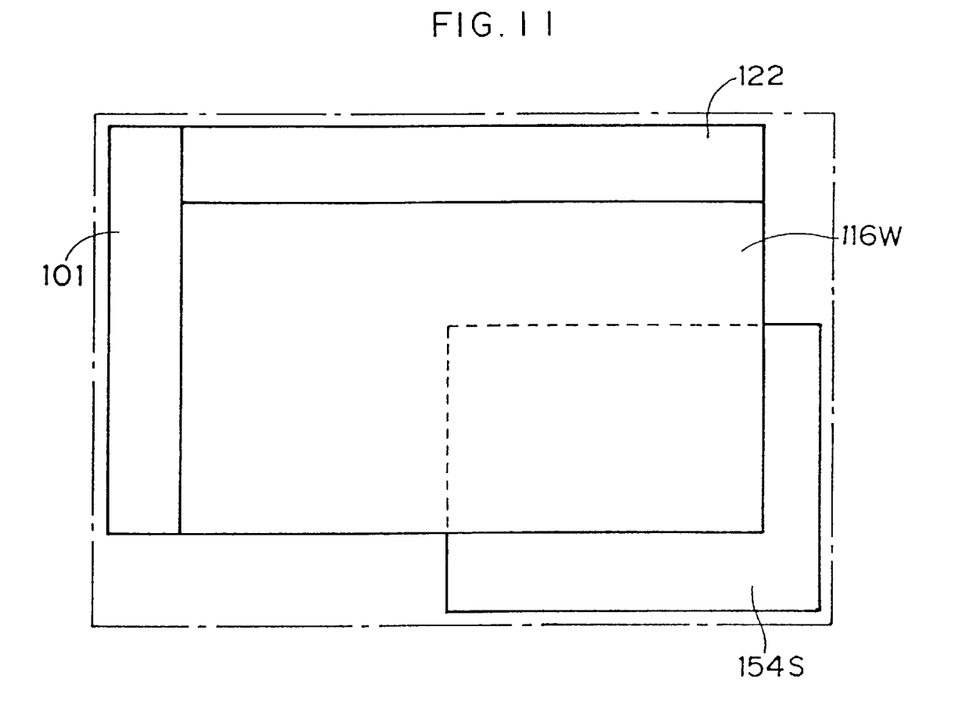
FIG. 11 is a diagram illustrating a relative positional relationship between an image-to-be-processed display screen (main region) and a past image icon display portion (auxiliary region), relating to a modified example of the present invention.

If such window screens are used, the respective positions at which the screens are displayed in the predetermined region in which display is possible can be changed independently of one another. In this way, as illustrated in FIG. 9, the screens can be displayed in a state in which they are separated from one another. The dot-chain line in FIG. 9 (as well as in FIG. 10 and FIG. 11) represents the periphery of the monitor screen.

The periphery (aspect ratio) of the past image icon display portion 154 can be freely set. For example, in the above-described embodiment, the past image icon display portion 154 is strip-like and extends horizontally. However, the past image icon display portion 154 may be a strip-like form extending vertically at the left side or the right side of the screen (see 154H in FIG. 10). Further, the past image icon display portion 154 may be made to have a substantially square periphery (see 154S in FIG. 11).

The image-to-be processed display portion 116 and the past image icon display portion 154 may be displayed with portions thereof overlapping. In this case, the portion which is the overlaying window may be freely selected.

As described above, in the method displaying past images relating to the present invention, when image processing is repeatedly carried out, the respective image-processed images automatically remain displayed as a record of past images, and are displayed in image states which allow the history of image processing to be visually confirmed. Thus, an excellent effect is achieved in that a desired image can be intuitively discerned.

What is claimed is:

1. A method of displaying history information comprising the steps of:
    displaying an image in a predetermined main region, and displaying history information in a predetermined auxiliary region;
    carrying out a plurality of image processes on the image displayed in the main region; and
    displaying in the main region an image after at least one of the plurality of image processes is carried out, and displaying at least one of: an image before the image process is carried out and information relating to the image before the image process is carried out, in the auxiliary region as history information in the order in which the plurality of image processes are carried out,
    wherein when an image in the auxiliary region is selected, information relating to the image is displayed instead of the image, and when information relating to the image is selected, the image is displayed.

2. A method of displaying history information according to claim 1, wherein the image displayed in the auxiliary region is an image before the image process is carried out and is displayed in the main region, and is a reduced image.

3. A method of displaying history information according to claim 1, wherein information relating to an image displayed in the auxiliary region comprises one of a character corresponding to the image process, a word corresponding to the image process, and an image obtained by subjecting the image to a predetermined process.

4. A method of displaying history information according to claim 1, wherein when the history information is selected, a predetermined processing is carried out on the history information.

5. A method of displaying history information according to claim 4, wherein the predetermined processing is processing for displaying in the main region the image corresponding to the selected history information.

6. A method of displaying history information according to claim 1, wherein the main region and the auxiliary region are displayed in independent window states, and the main region and the auxiliary region are moved independently within a single screen.

7. A method of displaying history information according to claim 1, wherein an image before the image process is carried out, may be selected from the auxiliary region.

8. A method of displaying history information according to claim 7, wherein when an image before an image process is selected from the auxiliary region, any previous image process upon that image located in the auxiliary region is removed.

9. A method of displaying history information according to claim 1, wherein when a maximum number of displayable history information in the auxiliary region has been exceeded and history information is to be additionally displayed in the auxiliary region, history information which has been displayed for the longest period of time and which is other than history information for which saving has been designated, is closed.

10. A method of displaying history information according to claim 9, wherein, among the history information, the history information corresponding to the image which was an initial object of processing is history information for which saving has been designated.

11. A method of displaying history information according to claim 1, wherein said image process comprises an automatic image process for enhancing lightness and saturation of an image.

12. A method of displaying history information according to claim 1, wherein said image process comprises a manual image process for correction of resolution, focus, brightness, vividness, and cut out of an image.

13. A method of displaying history information according to claim 1, wherein said image before an image process is carried out, is automatically displayed in the auxiliary region after an image process.

14. A device for displaying history information comprising:
   a display device which displays an image in a predetermined main region and displays history information in a predetermined auxiliary region;
   a processing device which carries out a plurality of image processes on the image displayed in the main region;
   a control device which controls the display device such that an image after one of the plurality of image processes is carried out is displayed in the main region, and an image before the image process is carried out and information relating to the image before the image process is carried out is displayed as history information in the auxiliary region in the order in which the plurality of image processes are carried out; and
   a selecting device which selects history information, wherein the control device effects control such that in a case in which an image is selected by the selecting device, information relating to the image is displayed in the auxiliary region instead of the image, and in a case in which information relating to the image is selected, the image is displayed in the auxiliary region.

15. A device for displaying history information according to claim 14, wherein the image displayed in the auxiliary region is an image before the image process is carried out and is displayed in the main region and is a reduced image.

16. A device for displaying history information according to claim 14, wherein information relating to an image displayed in the auxiliary region comprises one of a character corresponding to the image process, a word corresponding to the image process, and an image obtained by subjecting the image to a predetermined process.

17. A device for displaying history information according to claim 14, further comprising a selecting device which selects history information, wherein the control device effects control such that a predetermined process is carried out on the history information selected by the selecting device.

18. A device for displaying history information according to claim 17, wherein the predetermined processing is control processing for displaying in the main region an image corresponding to the history information selected by the selecting device.

19. A device for displaying history information according to claim 14, wherein the control device effects control such that the main region and the auxiliary region are displayed in independent window states, and the main region and the auxiliary region are moved independently within a single screen of the display device.

20. A device for displaying history information according to claim 14, wherein the control device effects control such that when a maximum number of displayable history information in the auxiliary region has been exceeded and history information is to be additionally displayed in the auxiliary region, history information which has been displayed for the longest period of time and which is other than history information for which saving has been designated, is closed.

21. A device for displaying history information according to claim 20, wherein the control device effects control such that, among the history information, the history information corresponding to the image which was an initial object of processing is history information for which saving has been designated.

22. A device for displaying history information according to claim 14, wherein said image process comprises an automatic image process for enhancing lightness and saturation of an image.

23. A device for displaying history information according to claim 14, wherein said image process comprises a manual image process for correction of resolution, focus, brightness, vividness, and cut out of an image.

24. A device for displaying history information according to claim 14, wherein said image and said information relating to the image are displayed in the auxiliary region for each image process carried out on the image displayed in the main region.

25. A device for displaying history information according to claim 14, wherein said image before an image process is carried out, is automatically displayed in the auxiliary region after an image process.

26. A device for displaying history information comprising:
   a display device which displays an image in a predetermined main region and displays history information in a predetermined auxiliary region;
   a processing device which carries out a plurality of image processes on the image displayed in the main region; and
   a control device which controls the display device such that an image after one of the plurality of image processes is carried out is displayed in the main region, and an image before the image process is carried out and information relating to the image before the image process is carried out is displayed as history information in the auxiliary region in the order in which the plurality of image processes are carried out,
   wherein when the image in the auxiliary region is selected, information relating to the image partially overlaps the image in the auxiliary region, and wherein the information can be closed when the image in the auxiliary region or the history information is selected by the user.

27. A method of displaying history information comprising the steps of:
   displaying an image in a predetermined main region, and displaying history information in a predetermined auxiliary region;

carrying out a plurality of image processes on the image displayed in the main region; and displaying in the main region an image after at least one of the plurality of image processes is carried out, and displaying at least one of: an image before the image process is carried out and information relating to the image before the image process is carried out, in the auxiliary region as history information in the order in which the plurality of image processes are carried out, wherein information relating to an image displayed in the auxiliary region comprises one of a character corresponding to the image process, a word corresponding to the image process, and an image obtained by subjecting the image to a predetermined process, and wherein when the image in the auxiliary region is selected, information relating to the image partially overlaps the image in the auxiliary region, and wherein the information can be closed when the image in the auxiliary region or the history information is selected by the user.

28. A device for displaying history information comprising:

a display device which displays an image in a predetermined main region and displays history information in a predetermined auxiliary region;

a processing device which carries out a plurality of image processes on the image displayed in the main region; and a control device which controls the display device such that an image after one of the plurality of image processes is carried out is displayed in the main region, and an image before the image process is carried out and information relating to the image before the image process is carried out is displayed as history information in the auxiliary region in the order in which the plurality of image processes are carried out, wherein information relating to an image displayed in the auxiliary region comprises one of a character corresponding to the image process, a word corresponding to the image process, and an image obtained by subjecting the image to a predetermined process, and wherein information about a change to an image is superimposed on the image in the auxiliary region in the area of the image which has been changed.

29. A method of displaying history information comprising the steps of:

displaying an image in a predetermined main region, and displaying history information in a predetermined auxiliary region;

carrying out a plurality of image processes on the image displayed in the main region; and displaying in the main region an image after at least one of the plurality of image processes is carried out, and displaying at least one of: an image before the image process is carried out and information relating to the image before the image process is carried out, in the auxiliary region as history information in the order in which the plurality of image processes are carried out, wherein information relating to an image displayed in the auxiliary region comprises one of a character corresponding to the image process, a word corresponding to the image process, and an image obtained by subjecting the image to a predetermined process, and wherein information about a change to an image is superimposed on the image in the auxiliary region in the area of the image which has been changed.

* * * * *